United States Patent
Sinha

(10) Patent No.: US 11,368,424 B2
(45) Date of Patent: *Jun. 21, 2022

(54) ENHANCED DOMAIN NAME SYSTEM (DNS) SERVER

(71) Applicant: Charter Communications Operating, LLC, St. Louis, MO (US)

(72) Inventor: Ashutosh Kumar Sinha, Centennial, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/193,944

(22) Filed: Mar. 5, 2021

(65) Prior Publication Data

US 2021/0226913 A1 Jul. 22, 2021

Related U.S. Application Data

(63) Continuation of application No. 16/746,199, filed on Jan. 17, 2020, now Pat. No. 10,972,426.

(51) Int. Cl.
*H04L 61/4511* (2022.01)

(52) U.S. Cl.
CPC .............................. *H04L 61/1511* (2013.01)

(58) Field of Classification Search
CPC .................................................. H04L 61/1511
See application file for complete search history.

(56) References Cited

U.S. PATENT DOCUMENTS

| | | | |
|---|---|---|---|
| 10,205,698 B1* | 2/2019 | Petersen | H04L 61/1511 |
| 2009/0113074 A1* | 4/2009 | Statia | H04L 29/12066 709/245 |
| 2010/0121979 A1* | 5/2010 | St. Pierre | H04L 63/1491 709/239 |
| 2012/0254996 A1* | 10/2012 | Wilbourn | H04L 61/6009 726/22 |
| 2013/0111066 A1* | 5/2013 | Vempati | H04L 61/1511 709/245 |
| 2016/0294631 A1 | 10/2016 | Byrnes et al. | |
| 2017/0111851 A1 | 4/2017 | Zhang et al. | |
| 2020/0412696 A1 | 12/2020 | Mouring et al. | |

* cited by examiner

*Primary Examiner* — Tonia L Dollinger
*Assistant Examiner* — Jihad K Boustany
(74) *Attorney, Agent, or Firm* — The Marbury Law Group, PLLC

(57) ABSTRACT

Systems, methods, and devices for resolving a network address include a Domain Name System (DNS) server configured to receive a request for a resource from a client device, determine a source IP address of the client device based on the information included in the received request, and determine whether the source IP address is included in a source client list. The server may identify a view associated with the source client list, and associate the client with the identified view, in response to determining that the source IP address is included in the source client list. The server may associate the client with a default view in response to determining that the source IP address is not included in the source client list.

18 Claims, 9 Drawing Sheets

ENHANCED DOMAIN NAME SYSTEM (DNS) SERVER

RELATED APPLICATIONS

This application is a continuation of, and claims the benefit of priority to, U.S. Non-Provisional patent application Ser. No. 16/746,199 entitled "Enhanced Domain Name System (DNS) Server," filed Jan. 17, 2020, now U.S. Patent No., the entire contents of which is hereby incorporated by reference for all purposes.

BACKGROUND

The Domain Name System (DNS) is a hierarchical and decentralized naming system for computers, services, or other resources connected to a communication network, such as the Internet. The DNS associates a variety of information with a domain names assigned to each of the participating entities. The DNS translates more readily memorized domain names to unique numerical addresses, such as Internet Protocol (IP) addresses, for locating and identifying computer services and devices with the underlying network protocols.

Client computing devices attempting to locate a resource on a communication network may send a DNS query that includes a fully qualified domain name (FQDN) or a requested resource address (e.g., a uniform resource identifier (URI) or a uniform resource locator (URL)) to a DNS server. The DNS server may respond with a DNS response that includes a resource identifier (e.g., IP address) of the requested resource address. The client computing device may receive and use the information included in the DNS response to locate and access the requested resource address.

In recent years, "DNS views" have grown in popularity and use. DNS views provide the DNS server with the ability to serve one version of DNS data to one set of client computing devices, and another version of DNS data to another set of client computing devices. That is, a DNS server that uses "views" may provide a different resource identifiers (e.g., IP addresses) in response to identical DNS queries depending upon the source of the query. As DNS views continue to grow in popularity and use, enhanced DNS servers that are better suited to implement or use DNS view technologies will be beneficial to network service providers and the consumers of their services.

SUMMARY

The various embodiments include methods for resolving a network address, including receiving a request for a resource from a client device, determining a source IP address of the client device based on the information included in the received request, determining whether the source IP address is included in a source client list, in which the source client list is associated with a view datastore, determining whether a default view datastore may include a record for requested resource in response to determine that the source IP address is not included in the source client list, and determining whether the requested resource is included in the view datastore in response to determining that the default view datastore does not include a record for requested resource and that the source IP address is not included in the source client list. Some aspects may include generating a response message that may include a SIPNOT-DEFINED indication in response to determining that the requested resource is included in the view datastore, or generating the response message to include a NXDOMAIN indication in response to determining that the requested resource is not included in the view datastore.

Some aspects may include sending the generated response message to the client device. In some aspects, receiving the request for the resource from the client device may include receiving a domain name system (DNS) request message from a DNS client device. In some aspects, receiving the request for the resource from the client device may include receiving a request message that may include a fully qualified domain name (FQDN) from the client device. In some aspects, receiving the request for the resource from the client device may include receiving the request in a domain name system (DNS) server. In some aspects, determining whether the requested resource is included in the view datastore in response to determining that the default view datastore does not include a record for requested resource and that the source IP address is not included in the source client list may include querying a database that maps resources to views. In some aspects, querying the database that maps resources to views may include querying a fully qualified domain name (FQDN) mappings database.

Further aspects disclosed herein include a computing device having a processor configured with processor-executable instructions to perform operations of the methods summarized above. Further aspects disclosed herein include a computing device including means for performing functions of the methods summarized above. Further aspects disclosed herein include a non-transitory processor-readable storage medium having stored thereon processor-executable instructions configured to cause a computing device processor to perform operations of the methods summarized above. Further aspects disclosed herein include a system that includes a sender computing device (e.g., a route origination entity component) and a receiver computing device configured to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
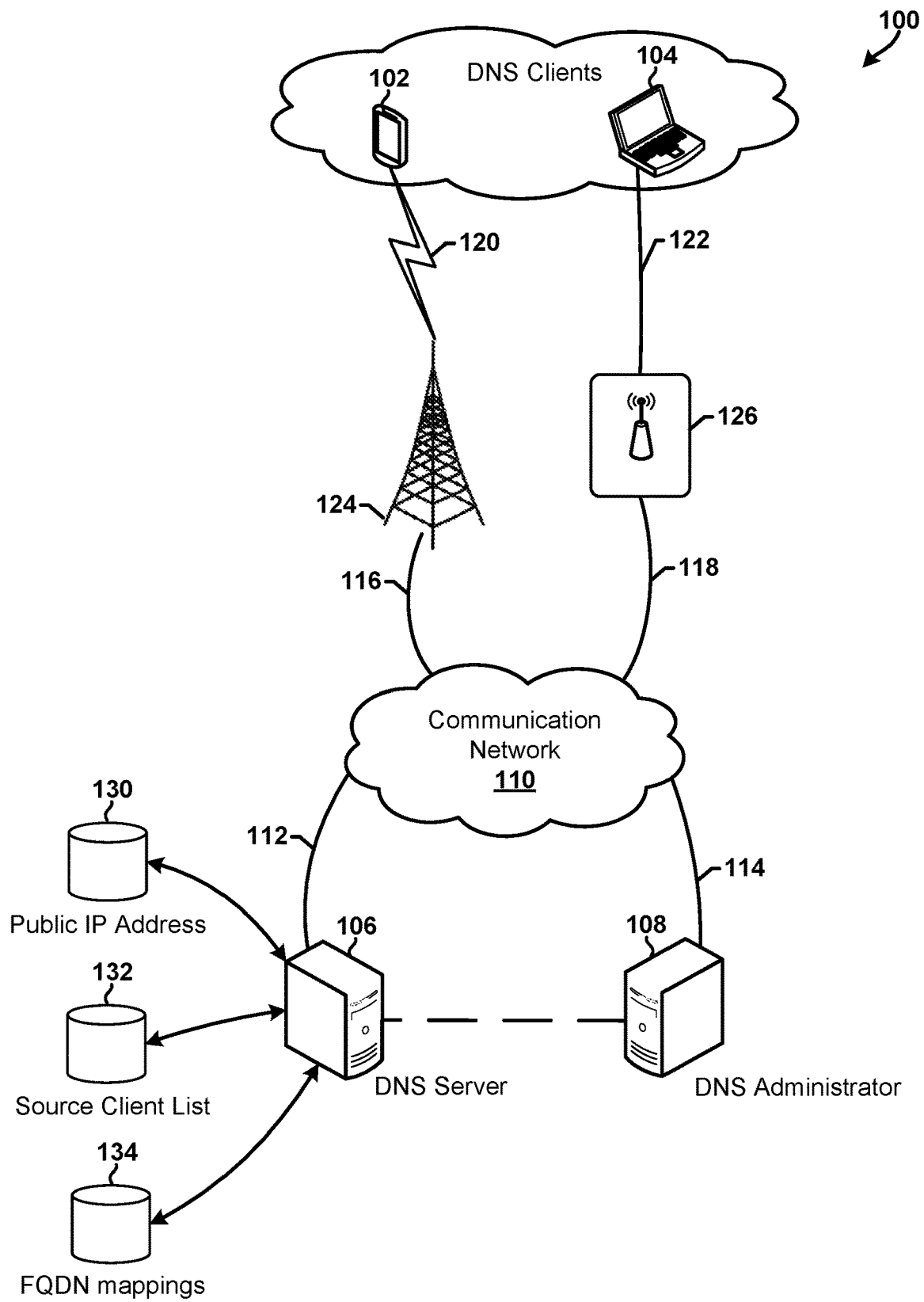
FIG. 1 is a communication system block diagram of an IP network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include components (e.g., servers, etc.) configured to receive a domain name system (DNS) request/query that includes a fully qualified domain name (FQDN) from a DNS client, determine the source internet protocol (IP) address (i.e., the IP address of the DNS client from which the request/query is received), and use the source IP address to query one or more source client lists. That is, the DNS server may store (or otherwise have access to) one or more source client lists that are each associated with a DNS view. The DNS server may determine whether the DNS client is associated with a particular view based on whether the source IP address is included in a source client list associated with that view. In this manner, the DNS view for the same DNS query that is provided to the DNS client may vary depending on the DNS client.

In response to determining that the DNS client is not associated with any particular view (i.e., that the source IP address is not included in any of the source client lists), the DNS server may determine whether the requested FQDN is associated with a view. The DNS server may send a DNS response with a response code of "SIPNOTDEFINED" to the requesting DNS client in response to determining that DNS client is not associated with any particular view but that the FQDN is associated a view.

Thus, unlike existing and conventional solutions, the DNS server may be configured to determine whether the requested FQDN is associated with a view in response to determining that the source IP address (i.e., the IP address of the DNS client making the query) is/is not included in any of the source client lists. Also unlike existing and conventional solutions, the DNS server may be configured to send a DNS response with a response code of "SIPNOTDEFINED" to the requesting DNS client in response to determining that DNS client is not associated with any particular view but that the FQDN is associated a view.

By sending a DNS response with a response code of "SIPNOTDEFINED" to the requesting DNS client when the FQDN is part of a view in which the DNS client IP address is not defined, components configured in accordance with the embodiments may allow the client computing device to quickly determine the reason that the DNS query failed and respond accordingly. This improves the security, performance and functioning of the service provider network, and the network components and user equipment devices that provide or use their services. Additional improvements and benefits associated with the implementation and use of the various embodiments will be evident from the disclosures below.

The term "service provider network" is used generically herein to refer to any network suitable for providing users with access to the Internet or IP services over broadband connections, and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The terms "component," "system," "engine," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The terms "computing device" and "user equipment (UE)" may be used interchangeably herein to refer to any one or all of satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable users to access communications service providers' services and distribute them around their house via a local area network (LAN), and similar electronic devices which include a programmable processor and memory and circuitry for providing the functionality described herein.

The term "server" may be used herein to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server).

The Domain Name System (DNS) is a hierarchical and decentralized naming system for computers, services, or other resources connected to the Internet or a private network. DNS associates various information with domain names assigned to each of the participating entities, and translates domain names to the numerical IP addresses for locating and identifying computer services and devices with the underlying network protocols.

Various embodiments may be implemented within a variety of communication systems 100, an example of which is illustrated in FIG. 1. In the example illustrated in FIG. 1, the communication system 100 may include a mobile device 102, a personal computer 104, a DNS server 106, and a DNS administrator 108 that may be coupled directly or indirectly to the communication network 110 via wired or wireless communication links 112-122. The DNS server 106 may include or have access to a public IP address datastore 130, a source client list datastore 132, and a FQDN mappings datastore 134.

In some embodiments, the mobile device 102 and/or the personal computer 104 may operate as a DNS client computing device, and send requests for resource addresses (e.g., DNS requests or queries, etc.) to the DNS server 106 via communication network 110.

The DNS server 106 may be configured to store, maintain, or access information about a domain structure and network addresses assigned to various network resources. For example, the DNS server 106 may be configured to communicate with a public IP address datastore 130 that contains a database of public IP addresses and their associated hostnames. In an alternative embodiment, the DNS server 106 may include an internal memory that contains the database of public IP addresses and their associated hostnames. The DNS server 106 may be configured to respond to requests for resource addresses (e.g., DNS requests or queries, etc.) and network addresses (e.g., public IP addresses) of network resources. That is, DNS server 106 may be configured to resolve, or translate, a hostname included in a DNS request/query to an IP address.

In addition, a DNS server 106 configured in accordance with the embodiments may be configured to receive a DNS request/query that includes a FQDN from a DNS client 102, 104, query the public IP address datastore 130 to determine the source IP address (i.e., the IP address of the DNS client 102, 104 from which the request/query is received), and use the source IP address to query source client list datastore 132. The DNS server 106 may determine whether the DNS client is associated with a particular view based on the results of the query. The DNS server 106 may be configured to query the FQDN mappings datastore 134 to determine whether the FQDN is associated with a particular view in response to determining that the DNS client is not associated with a view (e.g., in response to determining that the source IP address is not included in the source client list datastore 132, etc.). The DNS server 106 may be further configured to send a DNS response message with a response code of "SIPNOTDEFINED" to the requesting DNS client 102, 104 in response to determining that DNS client 102, 104 is not associated with a view but that the FQDN included in the received DNS request/query is associated a view.

Thus, unlike existing and conventional solutions, the DNS server 106 may be configured to query the FQDN mappings datastore 134 to determine whether the requested FQDN is associated with a view in response to determining that the source IP address (i.e., the IP address of the DNS client making the query) is/is not included in any of the source client lists. Also unlike existing and conventional solutions, the DNS server 106 may be configured to send a DNS response with a response code of "SIPNOTDEFINED" to the requesting DNS client 102, 104 in response to determining that DNS client 102, 104 is not associated with any particular view but that the FQDN included in the a the DNS request/query received from the DNS client 102, 104 is associated a view.

The DNS administrator 108 may be configured to perform DNS administration and/or DNS update functions. For example, the DNS administrator 108 may update or modify DNS information such as resource addresses, name-to-address resolutions, DNS zone files, and other such information. The DNS administrator 108 may also provide updated or modified DNS information to the DNS server 106.

Figure 2:
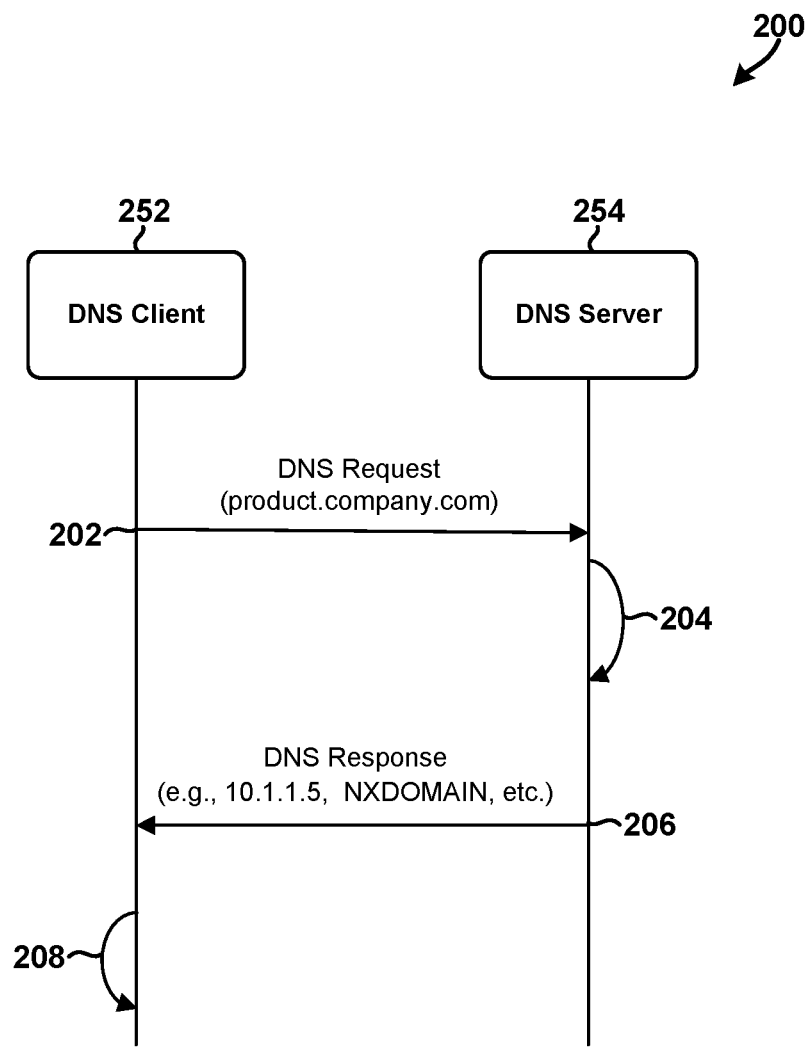
FIG. 2 is a message flow diagram illustrating components and interactions in a DNS system configured to translate more readily memorized domain names to unique numerical addresses in accordance to some embodiments.

FIG. 2 illustrates example components and operations in a system 200 configured to use DNS to resolve addresses. System 200 includes a DNS client 252 computing device (e.g., mobile device 102, laptop computer 104, etc.) and a DNS server 254 computing device (e.g., DNS server 106, etc.).

In operation 202, the DNS server 254 may receive a DNS request for a resource address (e.g., hostname, FQDN, etc.) from a DNS client 252. For example, the DNS server 254 receive a DNS request that includes the FQDN "product-.company.com" in operation 202.

In operation 204, the DNS server 254 may query a datastore that includes DNS zone files, tables, database records, or other similar data or information structures that associate hostnames or FQDNs with IP addresses. If the query results include a resource address, the DNS server 254 may generate a DNS response message that include the resource address. If the query results do not include a resource address (or otherwise indicate that datastore does not include a valid resource address for the requested resource), the DNS server 254 may generate the DNS response message to include an indication that the DNS server 254 was unable to determine the requested resource address. For example, the DNS server 254 may generate the DNS response message with a non-existent domain indication (e.g., NXDOMAIN).

In operation 206, the DNS server 254 may send the DNS response message to the DNS client 252. In block 208, the DNS client 252 may receive the DNS response message, and determine whether the DNS response message includes a resource address (e.g., 10.1.1.5, etc.) or an error indication (e.g., NXDOMAIN, etc.). If the DNS response message includes a resource address, the DNS client 252 may use the resource address to access the requested resource (e.g., by directing a browser to navigate to 10.1.1.5, etc.). If the DNS response message includes error indication (e.g., NXDOMAIN, etc.), the DNS client 252 may notify the user that the FQDN is not valid or that the requested site is not available.

Figure 3A:
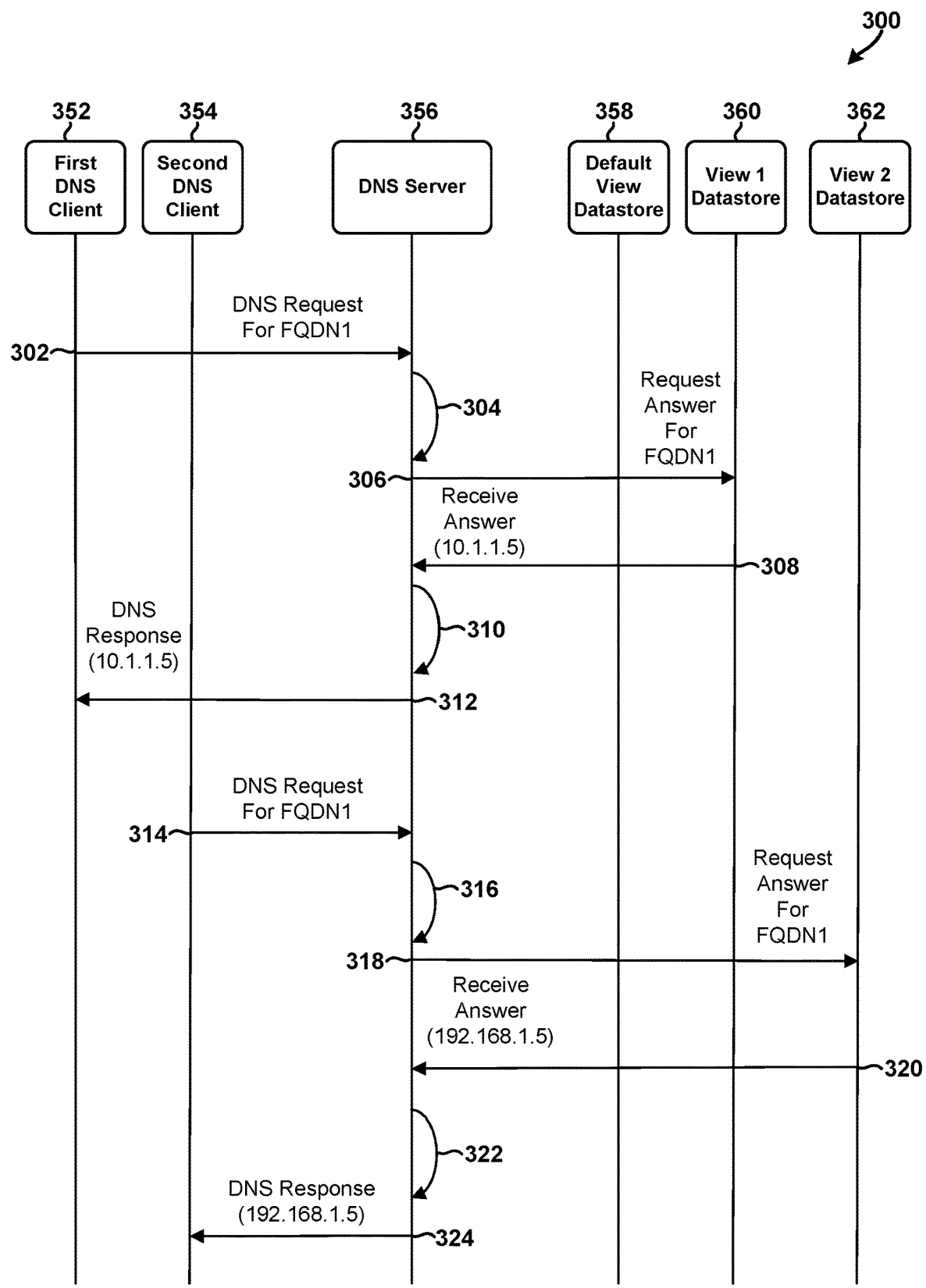
FIGS. 3A and 3B are message flow diagrams illustrating components and interactions in a DNS system configured to implement or use view in accordance to some embodiments.
Figure 3B:
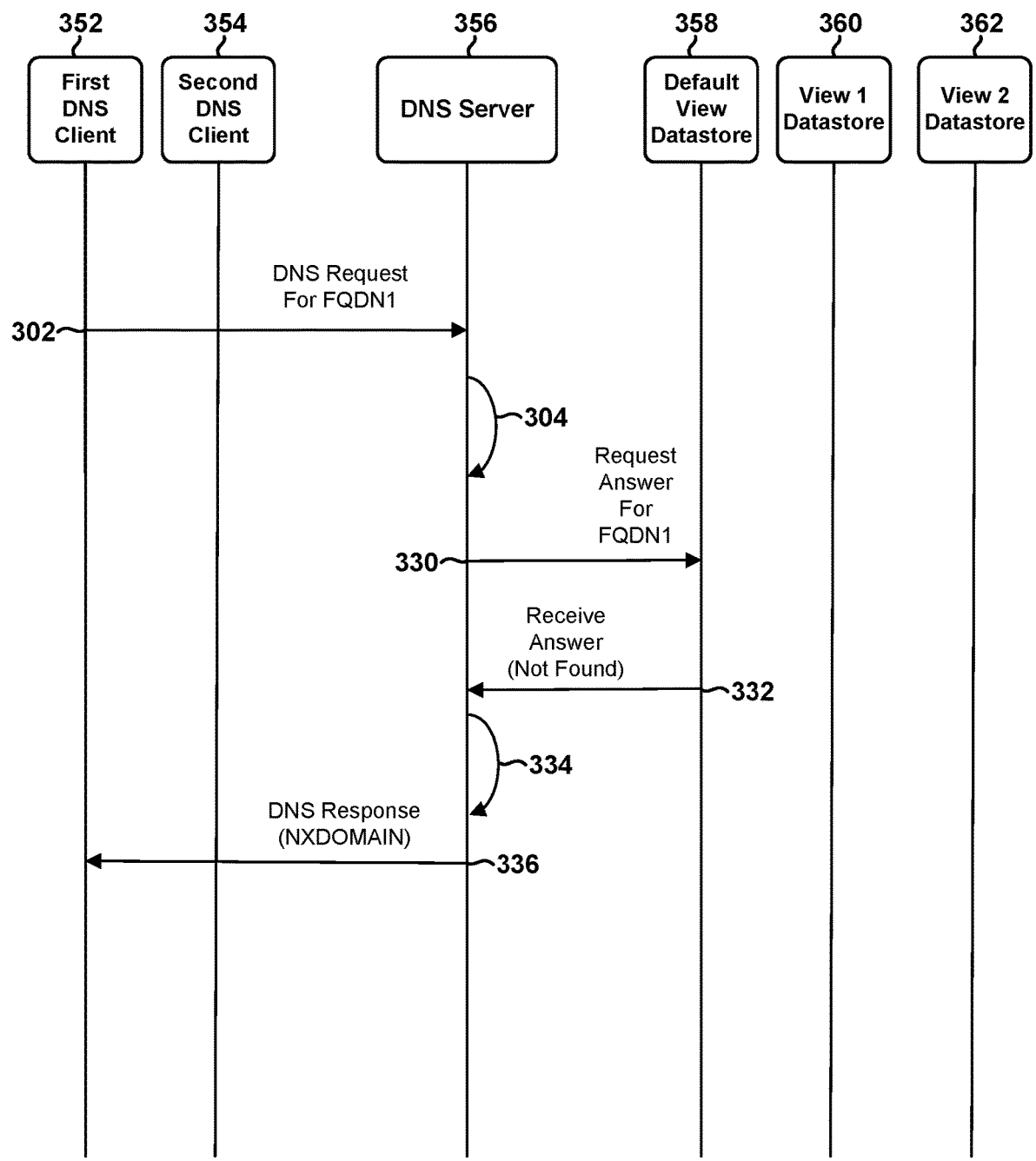

FIGS. 3A and 3B illustrate example components and operations in a system 300 configured to implement/use DNS views to resolve addresses. System 300 includes first DNS client 352, second DNS client 354, a DNS server 356 configured to implement/use DNS views, and multiple view datastores 358, 360, 362.

With reference to FIG. 3A, in operation 302, the DNS server 356 may receive a DNS request for FQDN1 (e.g., the FQDN "product.company.com") from the first DNS client 352 (e.g., mobile device 102, laptop computer 104, DNS client 252, etc.).

In operation 304, the DNS server 356 may determine the source IP address (i.e., the IP address of the first DNS client 352), and determine whether the source IP address is included in a source client list. In some embodiments, the DNS server 356 may determine the source IP address and/or determine whether the source IP address is included in a source client list by querying an external database (e.g., the public IP address datastore 130 and/or the source client list datastore 132 illustrated in FIG. 1, etc.). If the source IP address is included in a source client list, the DNS server 356 may identify a view associated with the source client list, and associate the first DNS client 352 with the identified view. If the source IP address is not included in any of the source client lists, the DNS server 356 may associate the first DNS client 352 with a default view. In the example illustrated in FIG. 3A, in operation 304, the DNS server 356 determines that the source IP address is included in a source client list, and that the first DNS client 352 is associated with "view 1."

In operation 306, the DNS server 356 may query the "view 1" datastore 360 for a resource address associated with FQDN1. In operation 308, the DNS server 356 may receive/retrieve the resource address (i.e., the IP address "10.1.1.5") associated with FQDN1 from the "view 1" datastore 360. In operation 310, the DNS server 356 may generate a DNS response message that includes the retrieved resource address. In operation 312, the DNS server 356 may send the generated DNS response message that includes the retrieved resource address (i.e., the IP address "10.1.1.5") to the first DNS client 352. The first DNS client 352 may then use the resource address included in the DNS response message to access the requested resource.

In operation 314, the DNS server 356 may receive another DNS request for FQDN1 (e.g., FQDN "product.company.com") from the second DNS client 354. In operation 316, the DNS server 356 may determine the source IP address (i.e., the IP address of the second DNS client 354). The DNS server 356 also determines that the source IP address is included in a source client list associated with "view 2." In operation 318, the DNS server 356 may query the "view 2" datastore 362 for a resource address associated with FQDN1. In operation 320, the DNS server 356 may receive/retrieve another resource address (i.e., the IP address 192.168.1.5, etc.) associated with FQDN1 from the "view 2" datastore 362.

In operation 322, the DNS server 356 may generate a DNS response message that includes the retrieved resource address. In operation 324, the DNS server 356 may send the generated DNS response message that includes the retrieved resource address (i.e., the IP address 192.168.1.5, etc.) to the second DNS client 354.

Thus, in the example illustrated in FIG. 3A, the DNS server 356 receives DNS requests for the same resource (i.e., FQDN1) in operations 302 and 314, but responds with different resource addresses (i.e., IP addresses "10.1.1.5" and "192.168.1.5") in operations 312 and 324. This is possible because the first and second DNS clients 352, 354 are each associated with their respective specific views (i.e., view 1 and view 2).

FIG. 3B illustrates an example in which the first DNS client 352 is not associated with a specific view. With reference to FIG. 3B, in operations 302 and 304, the DNS server 356 may perform the same operations discussed above with reference to FIG. 3A. In particular, the DNS server 356 may receive a DNS request from the first DNS client 352, determine the source IP address, and determine whether the source IP address is included in a source client list. However, unlike the example described above with reference to FIG. 3A, in operation 304 of FIG. 3B, the DNS server 356 determines that the source IP address is not included in any of the source client lists.

In response to determining that the source IP address is not included in any of the source client lists, in operation 330 the DNS server 356 queries the "default view" datastore 358 for a resource address associated with the requested resource (i.e., FQDN1).

In operation 332, the DNS server 356 receives the results/answer to the query, and determines based on the results/answer that the "default view" datastore 358 does not include a record for the requested resource (i.e., FQDN1) and/or does not store a valid resource addresses for the requested resource.

In operation 334, the DNS server 356 may generate a DNS response message with a non-existent domain indication (e.g., NXDOMAIN) to indicate that the DNS server 356 was unable to determine the requested resource address.

In operation 336, the DNS server 356 may send the generated DNS response message that includes the non-existent domain indication (e.g., NXDOMAIN) to the first DNS client 352. The first DNS client 352 may notify the user that an error occurred (e.g., that the hostname is not valid, that requested resource is not available, etc.).

Figure 4:
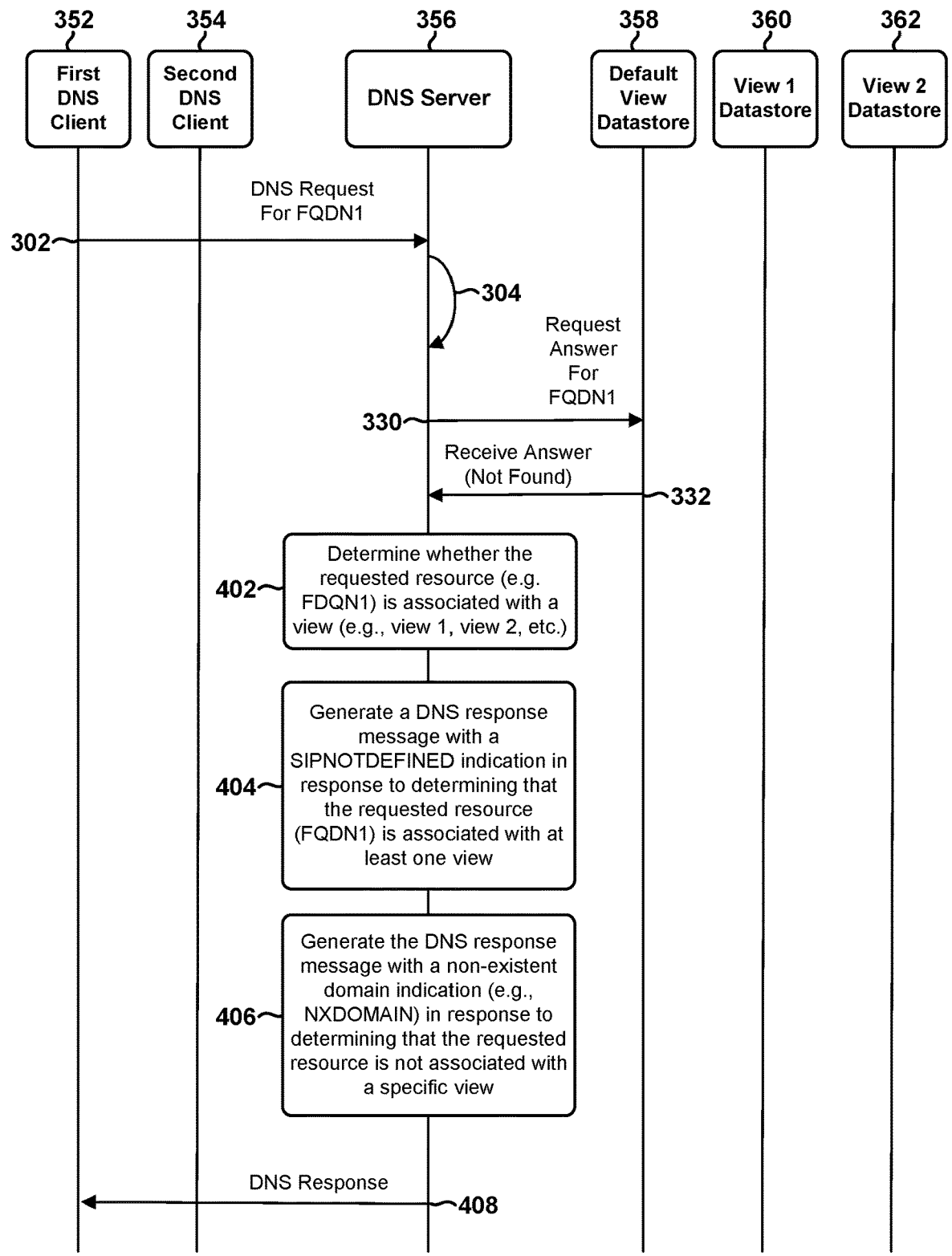
FIG. 4 is a message flow diagram illustrating components and interactions in a DNS system configured to implement views and give more meaning full error messages in accordance to some embodiments.

FIG. 4 illustrates components and operations in a system configured to implement/use DNS views to resolve addresses in accordance with the embodiments. In operations 302, 304, 330 and 332, the DNS server 356 may perform the same operations discussed above with reference to FIG. 3B. In particular, the DNS server 356 may receive a DNS request from the first DNS client 352, determine the source IP address, determine that the source IP address is not included in any of the source client lists (and thus that a default view should be used for the first DNS client 352), query the "default view" datastore 358 for a resource address associated with the requested resource (i.e., FQDN1), and determine based on the query results/answer that the "default view" datastore 358 does not include a record for the requested resource (i.e., FQDN1).

In operation block 402, the DNS server 356 may determine whether the requested resource (e.g. FDQN1) is associated with a view (e.g., view 1, view 2, etc.). That is, in response to determining that the source IP address is not included in any of the source client lists (e.g., in operation 304) and that the "default view" datastore 358 does not include a record for the requested resource (e.g., in operation 332), the DNS server 356 determine whether the requested resource (e.g., FQDN1) is associated with, or included in, any of the views.

In response to determining that the requested resource (FQDN1) is associated with at least one view, the DNS server 356 may generate a DNS response message with a SIPNOTDEFINED indication in operation block 404. On the other hand, in response to determining that the requested resource (FQDN1) is not associated with at least one view, the DNS server 356 may generate the DNS response message with a non-existent domain indication (e.g., NXDOMAIN) in operation block 406. In operation 408, the DNS server 356 may send the generated DNS response message to the first DNS client 352.

Figure 5A:
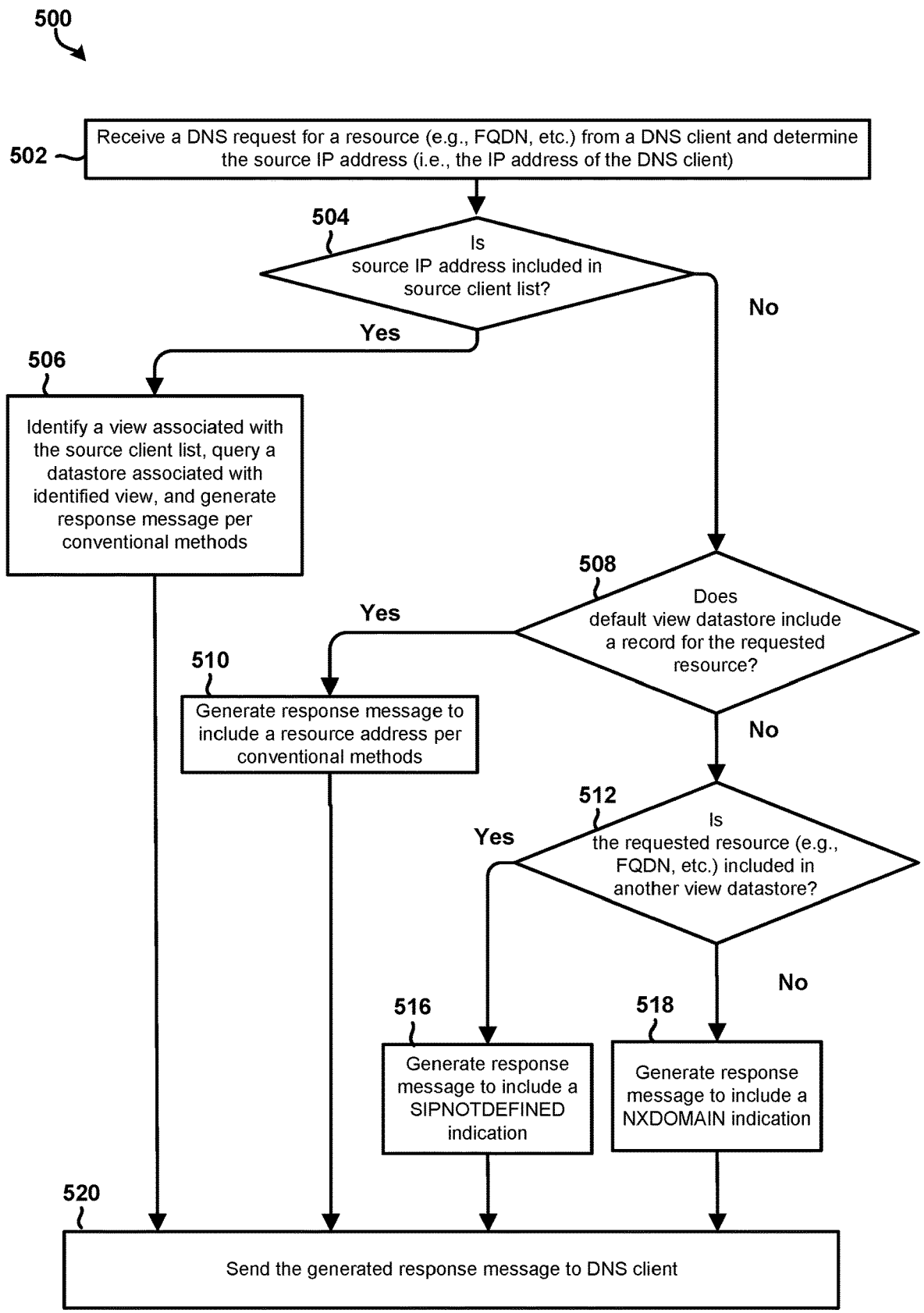
FIGS. 5A and 5B are process flow diagrams illustrating methods of implementing views, resolving network addresses and giving more meaning full error messages in accordance with some embodiments.
Figure 5B:
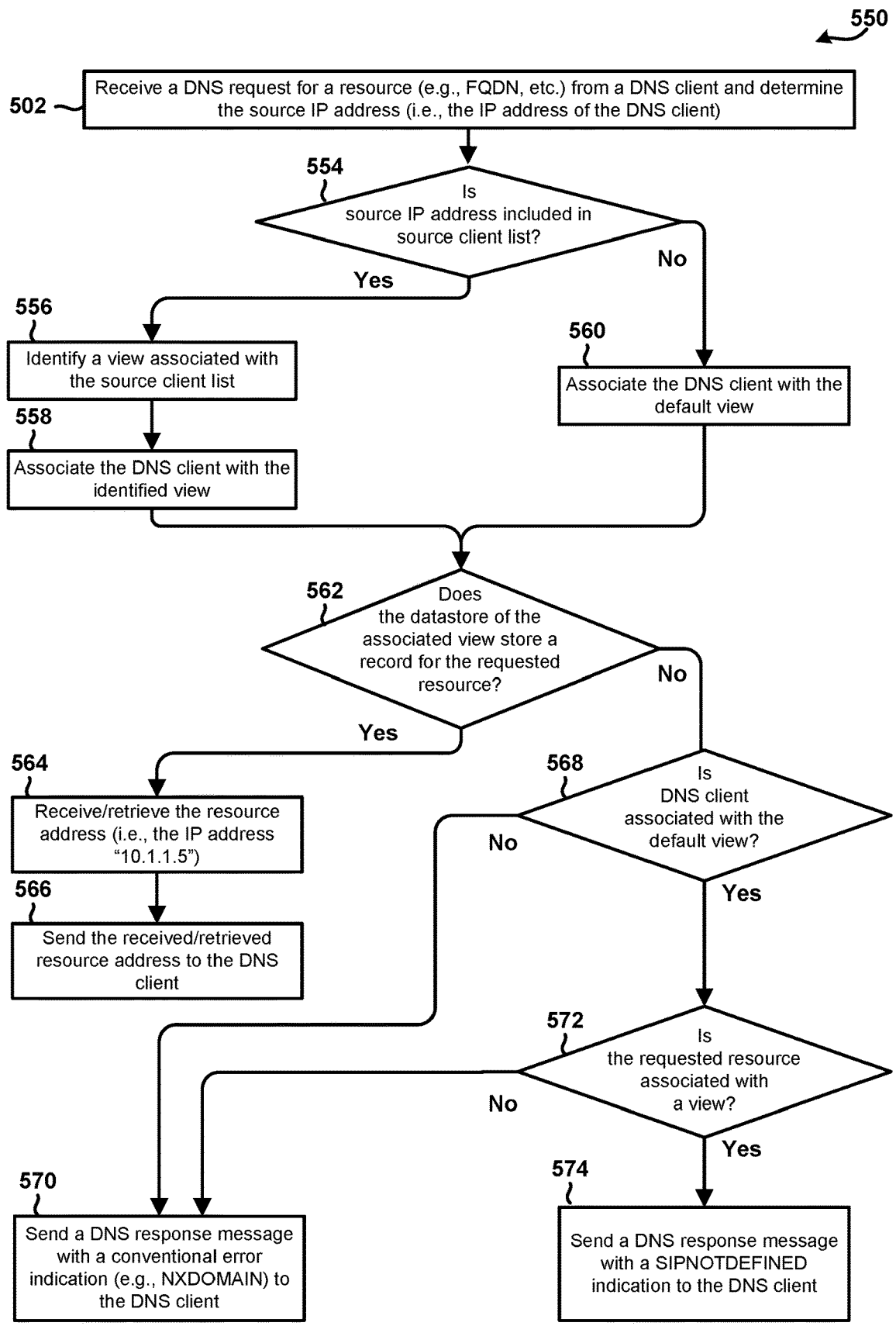

FIGS. 5A and 5B illustrate methods 500, 550 of implementing views, resolving network addresses and giving more meaning full error messages in accordance with some embodiments. Methods 500, 550 may be performed by one or more processors in one or more computing systems that implement a DNS server (e.g., the DNS server 106 illustrated in FIG. 1).

With reference to FIG. 5A, in block 502, a DNS server processor may receive a DNS request for a resource (e.g., FQDN, etc.) from a DNS client, and determine the source IP address (i.e., the IP address of the DNS client from which the message was received). In some embodiments, the DNS server processor may determine the source IP address by querying a public IP address datastore 130 (illustrated in FIG. 1).

In determination block 504, the DNS server processor may determine whether source IP address is included in a source client list. In some embodiments, this may be accomplished by querying a source client list datastore 132 (illustrated in FIG. 1) to determine whether the source client list datastore 132 stores a record corresponding to the determined source IP address.

In response to determining that the source IP address is included in a source client list (i.e., determination block 504="Yes"), the DNS server processor may identify a view associated with the source client list, query a datastore associated with identified view (e.g., datastores 360 or 362 illustrated in FIGS. 3A, 3B and 4, etc.) and generate response message per conventional methods or as described above with reference to FIG. 3A.

In response to determining that the source IP address is not included in any of the source client lists (i.e., determination block 504="No"), the DNS server processor may determine whether a default view datastore (e.g., the default view datastore 358 illustrated in FIGS. 3A, 3B and 4, etc.) includes a record corresponding to the requested resource (e.g., the FQDN included in the DNS request, etc.) in determination block 508.

In response to determining that the default view datastore includes a record corresponding to the requested resource (i.e., determination block 508="Yes"), in block 510, the DNS server processor may generate a response message that includes a resource address per conventional methods or as described above with reference to FIGS. 3A and 3B.

In response to determining that the default view datastore does not include a record corresponding to the requested resource (i.e., determination block 508="No"), in determination block 512, the DNS server processor may determine whether the requested resource (e.g., the FQDN included in the DNS request, etc.) is associated with a view or is included in a "non-default" view datastore.

In response to determining that the requested resource is associated with a view (i.e., determination block 512="Yes"), the DNS server processor may generate a response message that includes a SIPNOTDEFINED indication in block 516.

In response to determining that the requested resource is not associated with a view (i.e., determination block 512="No"), the DNS server processor may generate a response message that includes a NXDOMAIN indication in block 518. In block 520, the DNS server processor may send the generated response message to the DNS client.

With reference to FIG. 5B, in block 552, a DNS server processor may receive a DNS request for a resource (e.g., FQDN, etc.) from a DNS client, and determine the source IP address (i.e., the IP address of the DNS client from which the message was received). In determination block 554, the DNS server processor may determine whether source IP address is included in a source client list. In response to determining that the source IP address is included in a source client list (i.e., determination block 554="Yes"), the DNS server processor may identify a view associated with the source client list in block 556 and associate the DNS client with the identified view in block 558. In response to determining that the source IP address is not included in a source client list (i.e., determination block 554="No"), the DNS server processor may associate the DNS client with a default view in block 560.

In determination block 562, the DNS server processor may determine whether a datastore of the associated view (e.g., datastores 358-362 illustrated in FIGS. 3A, 3B and 4, etc.) store a record for the requested resource (e.g., a FQDN included in the received request, etc.). In response to determining that the datastore of the associated view stores a record for the requested resource (i.e., determination block 562="Yes"), the DNS server processor may receive/retrieve the resource address (i.e., the IP address "10.1.1.5") in block 564. In block 566, the DNS server processor may send the received/retrieved resource address to the DNS client (e.g., by generating and sending the DNS client a DNS response message that includes the received/retrieved resource address, etc.).

In response to determining that none of the datastores of the associated views store a record for the requested resource (i.e., determination block 562="No"), the DNS server processor may determine whether the DNS client is associated with a default view in determination block 568. In response to determining that the DNS client is associated with the default view (i.e., determination block 568="Yes"), the DNS server processor may determine whether the requested resource (e.g., a FQDN included in the received request, etc.) is associated with a view in determination block 572.

In response to determining that the DNS client is not associated with a default view (i.e., determination block 568="No") or in response to determining that the requested resource is not associated with a view (i.e., determination block 572="No"), the DNS server processor may send a DNS message with a conventional error indication (e.g., NXDOMAIN) to the DNS client in block 570.

In response to determining that the DNS client is associated with a default view (i.e., determination block 568="Yes") and the requested resource is associated with a view (i.e., determination block 572="Yes"), the DNS server processor may send a DNS message with a SIPNOTDEFINED indication to the DNS client in block 574.

Figure 6:
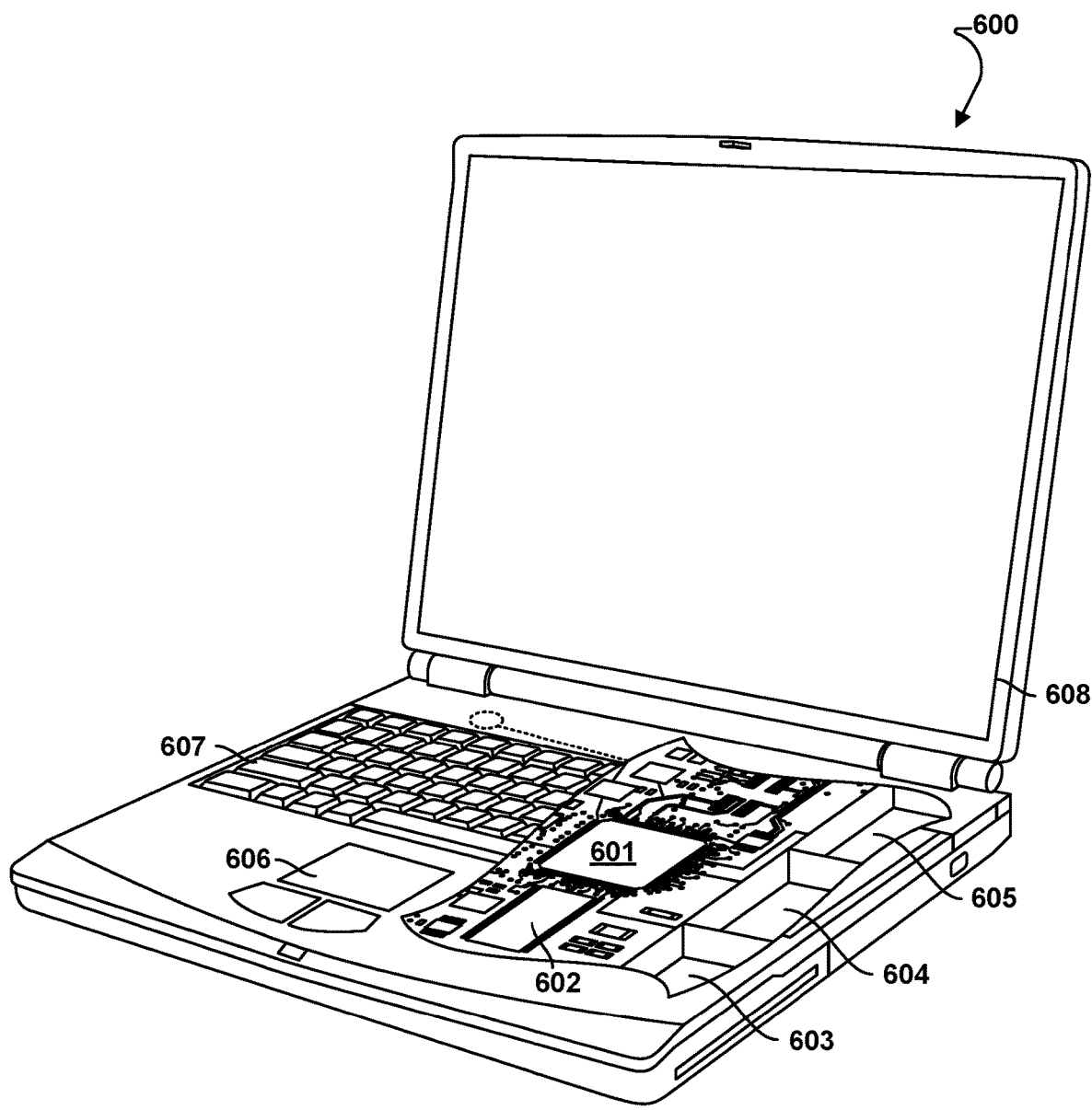
FIG. 6 is a component block diagram of a user equipment device in the form of laptop that is suitable for implementing some embodiments.

Various embodiments (including, but not limited to, embodiments discussed above with reference to FIGS. 1-5B) may be implemented in the laptop computer 600 illustrated in FIG. 6, which could be configured to operate as a DNS client or a DNS server. A laptop computer 600 may include a processor 601 coupled to a facial sensor, an image sensor, a sensor array, and other components so that the processor 601 perform any of the processing in any of the methods 200 or 300. The processor 601 may be coupled to volatile memory 602 and a large capacity nonvolatile memory, such as a disk drive 603 of Flash memory. The laptop computer 600 may also include a floppy disc drive 604 coupled to the processor 601. The laptop computer 600 may also include a number of connector ports 605 or other network interfaces coupled to the processor 601 for establishing data connections, such as a Universal Serial Bus (USB) or FireWire® connector sockets, or other network connection circuits for coupling the processor 601 to a network (e.g., a communications network). In a notebook configuration, the laptop computer 600 may include a touchpad 606, the keyboard 607, and a display 608 all coupled to the processor 601. Other configurations of computing devices may include a computer mouse or trackball coupled to the processor (e.g., via a USB input) as are well known, which may also be used in conjunction with various embodiments.

Figure 7:
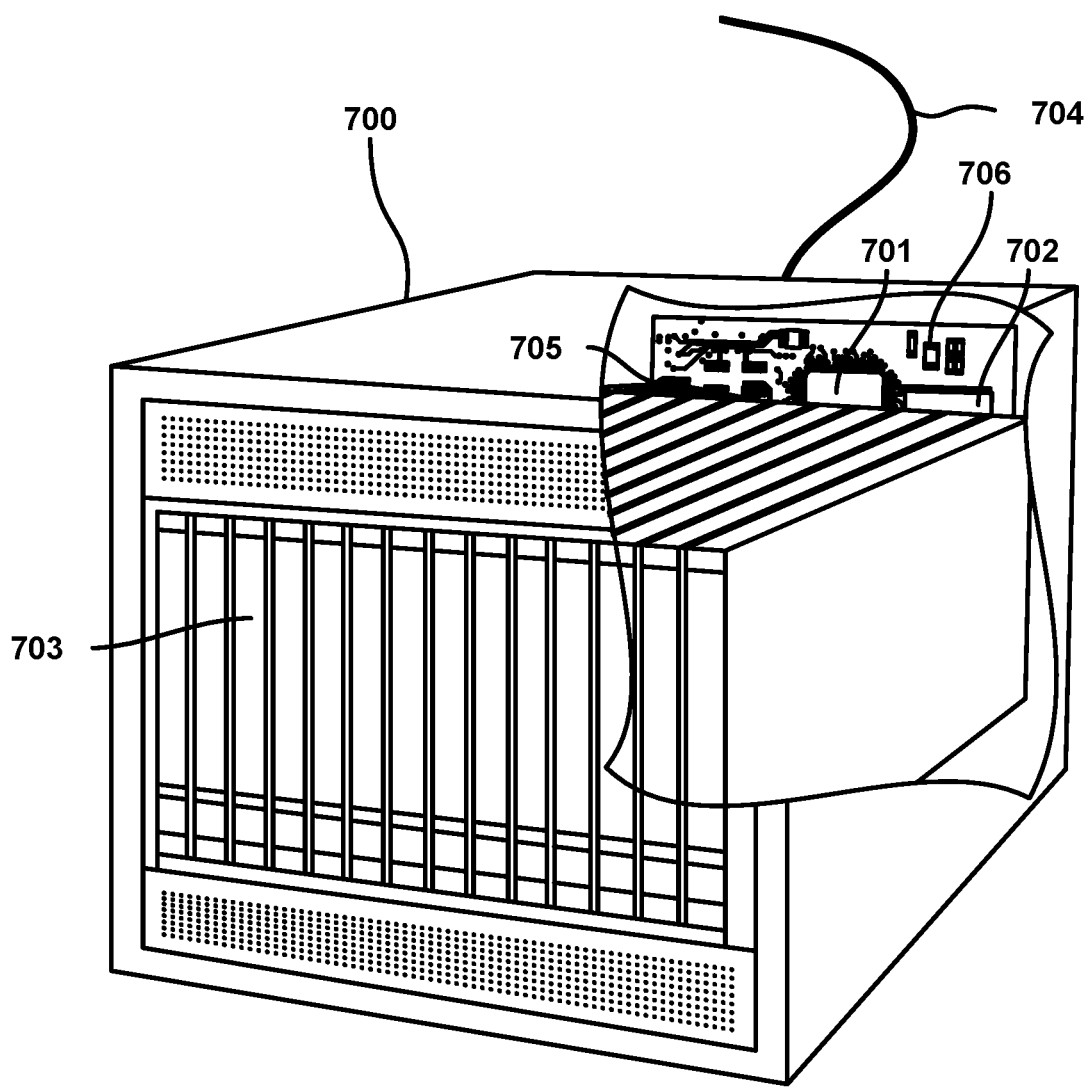
FIG. 7 is a component diagram of an example server suitable for use with some embodiments.

Various embodiments (including, but not limited to, embodiments discussed above with reference to FIGS. 1-5B) may be implemented on any of a variety of commercially available server devices, such as the server device 700 illustrated in FIG. 7. Such a server device 700 may include a processor 701 coupled to volatile memory 702 and a large capacity nonvolatile memory, such as a disk drive 703. The server device 700 may also include a floppy disc drive, compact disc (CD) or DVD disc drive 704 coupled to the processor 701. The server device 700 may also include network access ports 706 coupled to the processor 701 for establishing data connections with a network connection circuit 705 and a communication network (e.g., IP network) coupled to other communication system network elements.

The processors 601, 701 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 601, 701. The processors 601, 701 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 601, 701 including internal memory or removable memory plugged into the device and memory within the processors 601, 701 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for resolving a network address, comprising:
receiving a request for a resource from a client device;
determining a source IP address of the client device based on information included in the received request;
determining whether the source IP address is included in a source client list;
identifying a domain name system (DNS) view associated with the source client list and associating the client device with the identified DNS view in response to determining that the source IP address is included in the source client list;
associating the client device with a default DNS view in response to determining that the source IP address is not included in the source client list;
determining whether a datastore of an associated DNS view includes a record for the requested resource; and
determining whether a default DNS view datastore includes the record for requested resource in response to determining that the datastore of the associated DNS view does not include the record for the requested resource.

2. The method of claim 1, further comprising retrieving and sending a resource address for the requested resource to the client device in response to determining that the datastore of the associated DNS view includes the record for the requested resource.

3. The method of claim 1, further comprising generating and sending a response message that includes a NXDOMAIN indication to the client device in response to determining that the default DNS view datastore does not include the record for requested resource.

4. The method of claim 1, further comprising determining whether the requested resource is associated with a DNS view in response to determining that the default DNS view datastore includes the record for requested resource.

5. The method of claim 4, further comprising generating and sending a response message that includes a SIPNOTDEFINED indication to the client device in response to determining that the requested resource is associated with the DNS view.

6. The method of claim 4, further comprising generating and sending a response message that includes a NXDOMAIN indication to the client device in response to determining that the default DNS view datastore includes the record for requested resource and the requested resource is not associated with the DNS view.

7. A computing device, comprising:
a processor configured with processor-executable software instructions to:
receive a request for a resource from a client device;
determine a source IP address of the client device based on information included in the received request;
determine whether the source IP address is included in a source client list;
identify a domain name system (DNS) view associated with the source client list and associating the client device with the identified DNS view in response to determining that the source IP address is included in the source client list;
associate the client device with a default DNS view in response to determining that the source IP address is not included in the source client list;
determine whether a datastore of an associated DNS view includes a record for the requested resource; and
determine whether a default DNS view datastore includes the record for requested resource in response to determining that the datastore of the associated DNS view does not include the record for the requested resource.

8. The computing device of claim 7, wherein the processor is configured with processor-executable software instructions to retrieve and send a resource address for the requested resource to the client device in response to determining that the datastore of the associated DNS view includes the record for the requested resource.

9. The computing device of claim 7, wherein the processor is configured with processor-executable software instructions to generate and send a response message that includes a NXDOMAIN indication to the client device in response to determining that the default DNS view datastore does not include the record for requested resource.

10. The computing device of claim 7, wherein the processor is configured with processor-executable software instructions to determine whether the requested resource is associated with a DNS view in response to determining that the default DNS view datastore includes the record for requested resource.

11. The computing device of claim 10, wherein the processor is configured with processor-executable software instructions to generate and send a response message that includes a SIPNOTDEFINED indication to the client device in response to determining that the requested resource is associated with the DNS view.

12. The computing device of claim 10, wherein the processor is configured with processor-executable software instructions to generate and send a response message that includes a NXDOMAIN indication to the client device in response to determining that the default DNS view datastore includes the record for requested resource and the requested resource is not associated with the DNS view.

13. A non-transitory processor-readable storage medium having stored thereon processor-executable instructions configured to cause a processor of a computing device to perform operations for resolving a network address, the operations comprising:
receiving a request for a resource from a client device;
determining a source IP address of the client device based on information included in the received request;
determining whether the source IP address is included in a source client list;
identifying a domain name system (DNS) view associated with the source client list and associating the client device with the identified DNS view in response to determining that the source IP address is included in the source client list;
associating the client device with a default DNS view in response to determining that the source IP address is not included in the source client list;
determining whether a datastore of an associated DNS view includes a record for the requested resource; and
determining whether a default DNS view datastore includes the record for requested resource in response to determining that the datastore of the associated DNS view does not include the record for the requested resource.

14. The non-transitory processor-readable storage medium of claim 13, wherein the stored processor-executable instructions are configured to cause a processor to perform operations further comprising retrieving and sending a resource address for the requested resource to the client device in response to determining that the datastore of the associated DNS view includes the record for the requested resource.

15. The non-transitory processor-readable storage medium of claim 13, wherein the stored processor-executable instructions are configured to cause a processor to perform operations further comprising generating and sending a response message that includes a NXDOMAIN indication to the client device in response to determining that the default DNS view datastore does not include the record for requested resource.

16. The non-transitory processor-readable storage medium of claim 13, wherein the stored processor-executable instructions are configured to cause a processor to perform operations further comprising determining whether the requested resource is associated with a DNS view in response to determining that the default DNS view datastore includes the record for requested resource.

17. The non-transitory processor-readable storage medium of claim 16, wherein the stored processor-executable instructions are configured to cause a processor to perform operations further comprising generating and sending a response message that includes a SIPNOTDEFINED indication to the client device in response to determining that the requested resource is associated with the DNS view.

18. The non-transitory processor-readable storage medium of claim 16, wherein the stored processor-executable instructions are configured to cause a processor to perform operations further comprising generating and sending a response message that includes a NXDOMAIN indication to the client device in response to determining that the default DNS view datastore includes the record for requested resource and the requested resource is not associated with the DNS view.

* * * * *